United States Patent [19]

Allen et al.

[11] Patent Number: 4,497,201
[45] Date of Patent: Feb. 5, 1985

[54] PHASE-ANGLE CHECKING APPARATUS

[75] Inventors: Ralph Allen, Brackley; David A. Moore, Buckingham; Edward F. Quinton, Oxford, all of England

[73] Assignee: Leslie Hartridge Limited, Buckingham, England

[21] Appl. No.: 460,820

[22] Filed: Jan. 25, 1983

[30] Foreign Application Priority Data

Feb. 1, 1982 [GB] United Kingdom ............... 8202827

[51] Int. Cl.³ .................................... G01M 19/00
[52] U.S. Cl. .................................. 73/119 A; 73/754; 310/338
[58] Field of Search ............... 73/119 A, 168, 754; 310/338

[56] References Cited

U.S. PATENT DOCUMENTS

| | | | |
|---|---|---|---|
| 3,875,792 | 4/1975 | Krohn | 73/119 A |
| 3,946,590 | 3/1976 | Bechstein | 73/119 A |
| 4,046,004 | 9/1977 | Iwasaki | 73/119 A |
| 4,061,027 | 12/1977 | Emerson | 73/119 A |
| 4,109,517 | 8/1978 | Dyballa | 73/119 A |
| 4,227,402 | 10/1980 | Dooley | 73/119 A |
| 4,404,847 | 9/1983 | Larson | 73/119 A |
| 4,410,825 | 10/1983 | Lobastov | 310/338 X |

Primary Examiner—Gerald Goldberg
Assistant Examiner—Ellwood G. Harding, Jr.
Attorney, Agent, or Firm—Berman, Aisenberg & Platt

[57] ABSTRACT

Apparatus for measuring or otherwise checking phase angles between different lines of a multi-line fuel injection pump for an internal combustion engine, comprising an injector block defining a plurality of cavities. These cavities receive the nozzle ends of the fuel injectors of the different lines. Pressure sensors are arranged in communication with the cavity interiors to detect changes in pressure therein, and means are connected to the pressure sensors to provide a measurement of, or other check on, the phase angles of the different lines.

11 Claims, 6 Drawing Figures

PHASE-ANGLE CHECKING APPARATUS

The present invention relates to checking the phases of a multi-line fuel injection pump, especially to the measurement of the phase angles between a preselected datum-line and all the other lines of a multi-line fuel injection pump for an internal combustion engine.

Hitherto, this has been performed by two static methods, one of which may be termed low pressure spill phasing, and the other high pressure spill phasing. In low pressure spill phasing, spring loaded valves which are seated over the outlet ports of the individual injector pump elements are removed, so that test oil can be passed into the fuel galleries of the pump, and out through the outlet ports of the individual pump elements, at a relatively low pressure. During this method of testing, the drive shaft of the pump is rotated manually, and the instant at which each plunger of the individual pump elements cuts off the adjacent inlet port from the fuel galleries, at the point of port closure, is noted. The relative position of the drive shaft of the pump at these different instants is also noted, and if they do not have their correct angular spacings, an appropriate adjustment to the pump elements is made.

In the high pressure method, it is not necessary to remove the spring loaded valves seated above the outlet ports of the individual pump elements, but this does require a higher pressure of test fluid to overcome the force of the springs in the valves. Otherwise the method is identical to the low pressure method.

One disadvantage of such static phasing methods is the slight inaccuracy introduced because no account is taken of the different conditions prevailing when the engine is operating at speed. Various transients, such as the time taken for a pressure wave to be propagated from a pump element to an injector, and the give in the various components when they are subjected to increases in fuel oil pressure, then become significant as regards the relative phases of the different lines.

These problems can be overcome by a dynamic phasing method in which a sensor is arranged to detect a particular instant in the pumping cycle of each of the individual lines, and to give an output signal at that instant. The signals from all the sensors operate a strobe light, so that it flashes each time it receives an output signal from any one of the sensors. The strobe light is positioned so that it illuminates a ring attached to the drive shaft of the pump under test. A number of marks are provided on the ring, the marks having predetermined angular spacings between them. They lie on a helical path around the ring, so that if the pump is operating with the correct angular spacing between the phases of its different lines, the strobe will illuminate the markings on the rings in such a way that a number of the marks, being the same as the number of lines of the pump, appear to lie on the same straight line.

Two forms of sensor have hitherto been proposed for use with this dynamic phasing method. One comprises a spring contact positioned adjacent to the nozzle of an injector, which contact is closed when fuel is shot out of the nozzle. The other sensor is a proximity transducer which is positioned over a needle of an injector to detect when that needle is lifted by test oil pumped through the injector by the associated pump element.

This previously proposed dynamic phasing method suffers from a number of disadvantages. One is that the processing time is increased by the need for a sensor to be attached to each injector. A second, and perhaps more significant disadvantage is that a sensor has to be tailor-made for each of the various different types of injectors at present in use.

It is an aim of one aspect of the present invention to provide apparatus which reduces the time required for testing injector pumps, in combination with the injectors which are actually used with that pump when it is used to feed fuel to an engine, irrespective of the particular shape and design of those injectors.

Accordingly, in this aspect of the present invention, the nozzle end of each injector is inserted into a cavity, and a pressure sensor, in communication with that cavity, detects when fuel is shot out through the nozzle of the injector.

. Thus this aspect of the present invention may provide apparatus for measuring or otherwise checking phase angles between different lines of a multi-line fuel injection pump for an internal combustion engine, comprising an injector block or other part or parts defining a plurality of cavities, for respectively receiving the nozzle ends of the fuel injectors of the different lines, pressure sensors respectively arranged in communication with the cavity interiors to detect changes in pressure therein, and means connected to the pressure sensors to provide a measurement of, or other check on, the phase angles between the different lines.

This aspect of the invention may also provide a method of measuring or otherwise checking phase angles between different lines of a multi-line fuel injection pump for an internal combustion engine, comprising inserting the nozzle end of the fuel injectors of the different lines into respective cavities, detecting instants at which changes in pressure occur in the cavities owing to fluid being shot through the nozzle of the injectors, by means of respective pressure sensors, and using those detected instants to provide a measurement or other check on the phase angles between the different lines.

As regards their application to the foregoing aspect of the present invention, a problem associated with pressure transducers which have hitherto been available is that, because they tend to give a continuous output signal indicative of the actual pressure which they are being used to measure, it is difficult to isolate that part of the signal which indicates commencement of injection of the fuel through the nozzle of an injector. It is therefore preferable to use a sensor which is more sensitive to changes in the pressure than one which gives a continuous reading of actual pressure values. This suggests the use of a piezogenerative crystal. It has always been believed, up to the present time, that to work effectively, this crystal must be clamped firmly in position in its sensor and in relation to the part on which the sensor is mounted. However, for the present purposes, it has been found that the output signal thus produced takes too long to die away, and the signal-to-noise ratio is too high to enable the commencement of injection part of the signal to be isolated unambiguously.

The Applicants have found surprisingly, and contrary to the recognised teaching in the art hitherto, that a very sharp and clear leading edge of the signal, representing commencement of injection, is obtainable if a piezogenerative crystal is not clamped in position.

Accordingly, according to a further aspect of the present invention, there is provided a pressure sensor comprising a piezogenerative crystal and means for enabling an electrical voltage generated across the crystal to be indicated, in which the crystal is retained loosely in the sensor.

One advantage of such a pressure sensor is that it is capable of operating over a very wide range of pressures. A conventional pressure transducer that is sensitive enough to detect the lowest values of this range would be destroyed at the highest values. Conversely, a conventional pressure transducer that is robust enough to detect the highest values in the range would be too insensitive to detect the lowest values.

A further advantage of a pressure sensor in accordance with this invention is that it needs no preliminary calibration, for example to counter the back-pressure in the test oil, since it responds to changes in pressure rather than absolute values.

A further problem associated with the previously proposed dynamic phasing method as already described herein is that the strobe method makes it difficult to determine which line is represented by which illuminated mark on the marked ring.

An aim of another aspect of the present invention is to overcome this problem and, accordingly, this aspect of the invention is directed to apparatus for measuring or otherwise checking phase angles between different lines of a multi-line fuel injection pump for an internal combustion engine, comprising means for detecting a particular instant in the pumping cycle as it occurs in each line, means for monitoring rotation of a drive shaft of the pump, electronic circuitry connected to receive output signals from the detector means and the monitoring means and to provide therefrom a measurement or other check on the phase angles, and selector switch means connected to selectively allow output signals from the detector means to pass to the electronic circuitry.

One problem encountered by such apparatus when it is also in accordance with the first-mentioned aspect of the invention is that a series of high values occur in the signal from the pressure sensor following the leading edge which represents commencement of injection. In one form of the present invention, this problem is overcome by using electronic circuitry which comprises a signal detector which is triggered when it receives an input signal that exceeds, or rises through a threshold value, and means connected to receive output signals from the detector and to provide a lockout signal for a predetermined interval after it first receives a signal from the detector.

To account for possible variations in the rotational speed of the drive shaft of the pump under test, the predetermined interval may be set to correspond to a given angle of rotation of the drive shaft, rather than a given absolute time period.

An example of a dynamic phasing system which incorporates the foregoing aspects of the present invention is illustrated in the accompanying drawings, in which—

Figure 1:
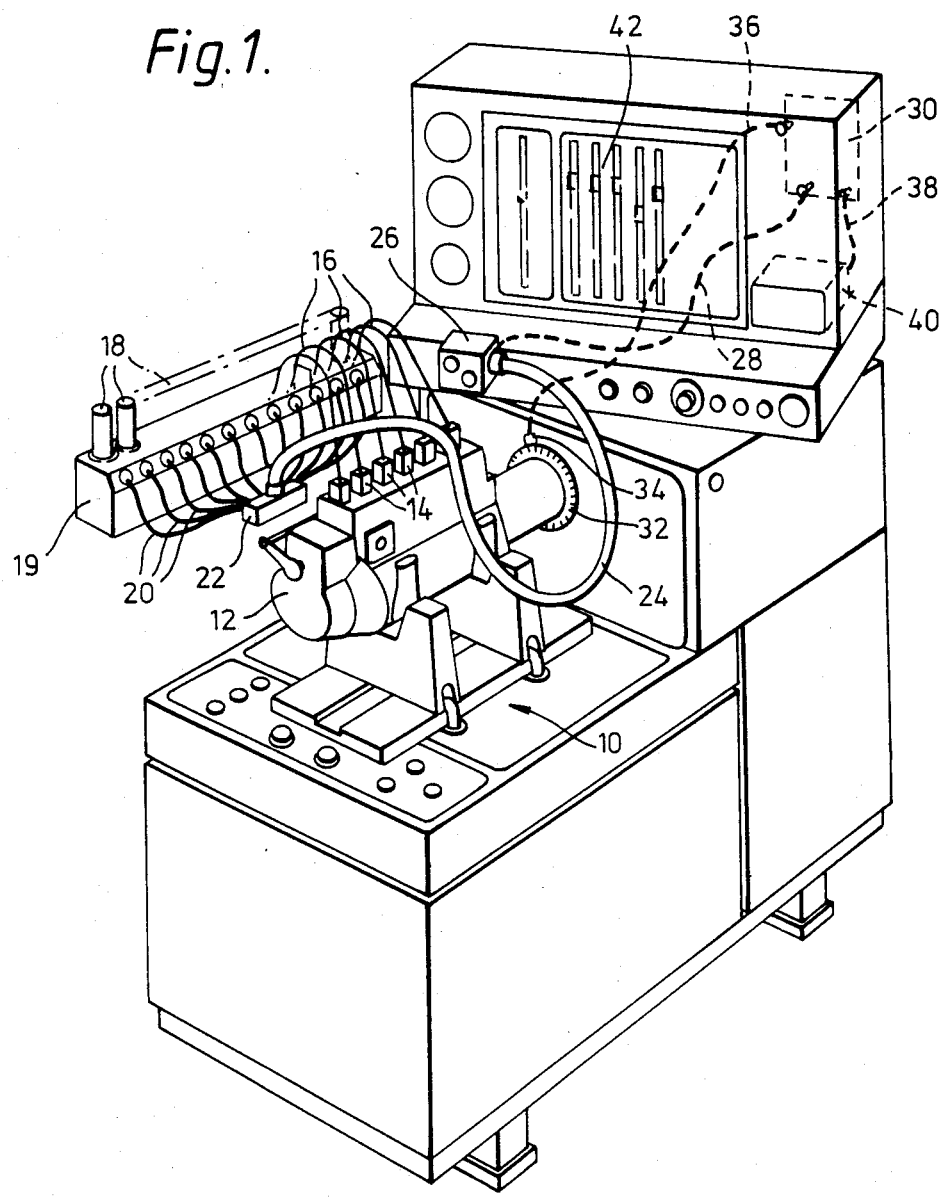
FIG. 1 shows a perspective view of the system incorporated in apparatus which also provides a volumetric measurement of test fluid which is pumped through the injector under test.

The apparatus shown in FIG. 1 comprises a test bench 10 on which is mounted a multi-line fuel injection pump 12 with a number of individual pump elements 14, one for each line. In the fuel injection pump illustrated, there are six lines, and accordingly there are six individual pump elements. Respective feed pipes 16 lead away from the pump elements 14 to respective injectors 18 held in an injector block 19 of the apparatus. The illustrated injector block 19 is capable of holding up to 12 injectors, although it is not necessary to use all of these during one testing procedure, and indeed in the illustrated apparatus only six are in use. However, it would be possible for the system to test another four or six-line injector fuel pump simultaneously with the one illustrated.

Leads 20 connect respective pressure sensors (not shown in FIG. 1) associated with each injector mount of the injector block 19 to a junction box 22. Each lead 20 is connected to a corresponding conductor in a ribbon cable 24 which extends from the junction box 22 to a selector box 26. This has two signal output lines carried by a single lead 28 to a printed circuit board 30.

The system also includes a pulse-generating wheel 32 which is rotationally fast with the drive shaft of the injector pump 12. The pulse-generating wheel 32 is magnetically or optically marked at points around its circumference which have equal angular spacing, and in this particular case it has one hundred and twenty marks spaced apart at three degree intervals. A magnetic or optical pick-up head 34 is clamped at a fixed position adjacent to the periphery of the wheel 32 so that a pulse signal is transmitted along the output lead 36 from the pick-up head 34 to the printed circuit board 30 every time one of the magnetic or optical marks on the wheel 32 passes the head 34. This enables the electronic circuitry on the printed circuit board 30, to be described in greater detail hereinafter, to measure the angle through which the drive shaft of the pump 12 rotates in between signals supplied successively by any two of the pressure sensors as selected by the selector box 26. A display bus lead 38 connected between the printed circuit board 30 and a digital display 40 allows this measurement to be indicated visually.

A signal from a pressure sensor indicates commencement of injection by the adjacent injector. The angular measurement displayed on the digital display 40 therefore shows the phase angle between two successive commencements of injection of the two lines of the fuel pump 12 selected at the selector box 26.

Figure 2:
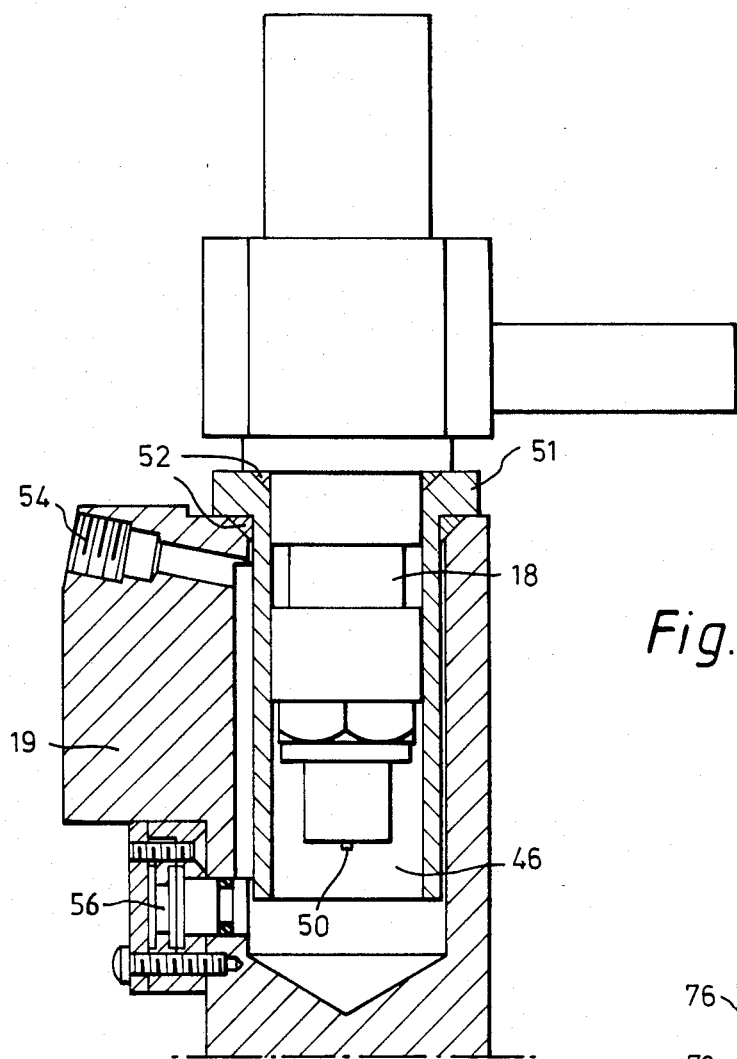
FIG. 2 shows, on a larger scale, an axial-sectional view of a part of the dynamic phasing system shown in FIG. 1.

The manner in which a pressure sensor is used to detect the commencement of injection by an injector is shown in FIG. 2. This shows that the injector block 19 has a cavity 46 for receiving the nozzle end of an injector 18. Although only one cavity 46 is illustrated in FIG. 2, the injector block 19 has twelve such cavities to enable up to twelve injectors 18 to be mounted on the injector block 19. The injector 18 is held by a clamp (not shown) with its nozzle 50 within the cavity 46 and a seal formed all the way round a shoulder of the injector 18 and an upper end of the cavity 46 by means of a collar 51 and O-ring seals 52. As shown in FIG. 2, the clamp (not shown) is used to urge the injector 18 downwardly to such an extent that the normally circularly cross-sectioned O-rings are squashed into a triangular cross-section defined by the surfaces which they contact. The system is therefore a closed chamber measuring system although it could possibly be an open chamber measuring system with the illustrated devices and circuitry. The only outlet from the chamber 46 is via an outlet port 54, and a back-pressure valve (not shown) is arranged downstream of the outlet to ensure a minimum of pressure of fluid within the chamber 46. This pressure ensures that any free air or gas created as tiny bubbles in the test oil due to turbulence following injection is re-absorbed by the test oil. A pressure sensor 56 is mounted on the injector block 19 so as to be in communication with the cavity 46. Although only one pressure sensor 56 is shown in FIG. 2, it will be appreciated that there are twelve in the system altogether, one for each cavity 46.

When test fluid is shot through the nozzle 50, a pressure wave thus generated at the commencement of injection is transmitted through the test fluid in the cavity 46 to the pressure sensor 56, whereupon an electrical signal is generated by the pressure sensor indicative of the commencement of injection. The electrical signal occurs slightly after the actual commencement of injection, but the delay corresponds to approximately 1/5 degree rotation of the pump drive shaft at appropriate speeds of revolution thereof.

Figure 3:
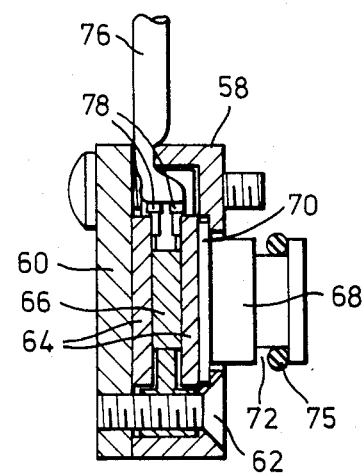
FIG. 3 shows an axial-sectional view, on a larger scale still, of a component which is shown in FIG. 2.

The structure of the pressure sensor 56 which enables it to generate an output electrical signal at the commencement of injection is illustrated in FIG. 3. It comprises a mild steel housing 58 (although this could equally well be made of a synthetic plastics material such as nylon) clamped to a rigid mild steel end plate 60 by means of screws 62 (only one of which is shown in FIG. 3). An interior space defined between the housing 58 and the end plate 60 houses two circularly shaped pieces of copper clad board 64 which lie parallel to one another with their copper clad faces towards one another. A lead zirconate titanate ceramic piezogenerative crystal 66 is sandwiched between the copper clad faces of the pieces of board 64. A light aluminium piston 68 of the sensor has a flanged head 70 positioned adjacent to the outer face of the board piece 64 which is further from the end plate 60, most of the piston 68 projecting outwardly from the sensor through a central hole in the housing 58. The piston 68 is restrained from movement away from the rest of the sensor by virtue of the flange head 70 engaging an inside shoulder surface of the housing 58. Two conductors of an output lead 76 from the sensor are soldered respectively to the copper clad surfaces of the board pieces 64 at solder points 78.

The dimensions of the interior space defined between the housing 58 and the end plate 60 are slightly greater than that required to accommodate the board pieces 64, the crystal 66, and the flanged piston head 70. This means that the crystal 66 is retained loosely in the sensor. In this respect, the crystal can be said to be decoupled, or free-floating. Although this is contrary to the recognised teaching in the art of piezogenerative crystals, it has surprisingly been found to create a sharper and more distinctive leading edge to the signal which represents the commencement of injection.

The pressure sensor 56 is clamped to the injector block 19 with its piston 68 extending through a bore in the injector block 19 leading to the cavity 46 so that the free end of the piston 68 is in contact with the test fluid in the cavity 46 when the system is in use. The piston 68 has a neck portion 72 around which extends an O-ring 75 that forms a seal between the piston 68 and the interior surface of the bore through which the piston 68 extends.

It will be appreciated therefore, that when the pressure sensor 56 is mounted for operation as shown in FIG. 2, the components within the sensor do not rattle about, because of the pressure of the test fluid in the cavity 46 acting on the piston 68 to urge it inwardly towards the rest of the sensor, and also because of the damping effect of the O-ring 75.

At the commencement of injection, when test fluid is shot through the nozzle 50 into the cavity 46, the pressure wave set up strikes the free end of the piston 68 which is thereby urged towards the board pieces 64 and the crystal 66. Because of the intrinsic properties of the crystal 66, the shock of sudden stress which it thereby experiences, being rapidly squashed between the board pieces 64 which in turn are squashed between the piston 68 and the end plate 60, causes the crystal to produce an electrical voltage or electromotive force across its main faces. This voltage is applied across the copper cladding of the two board pieces 64, and consequently across the two conductors of the output lead 76 of the sensor.

Figure 4:
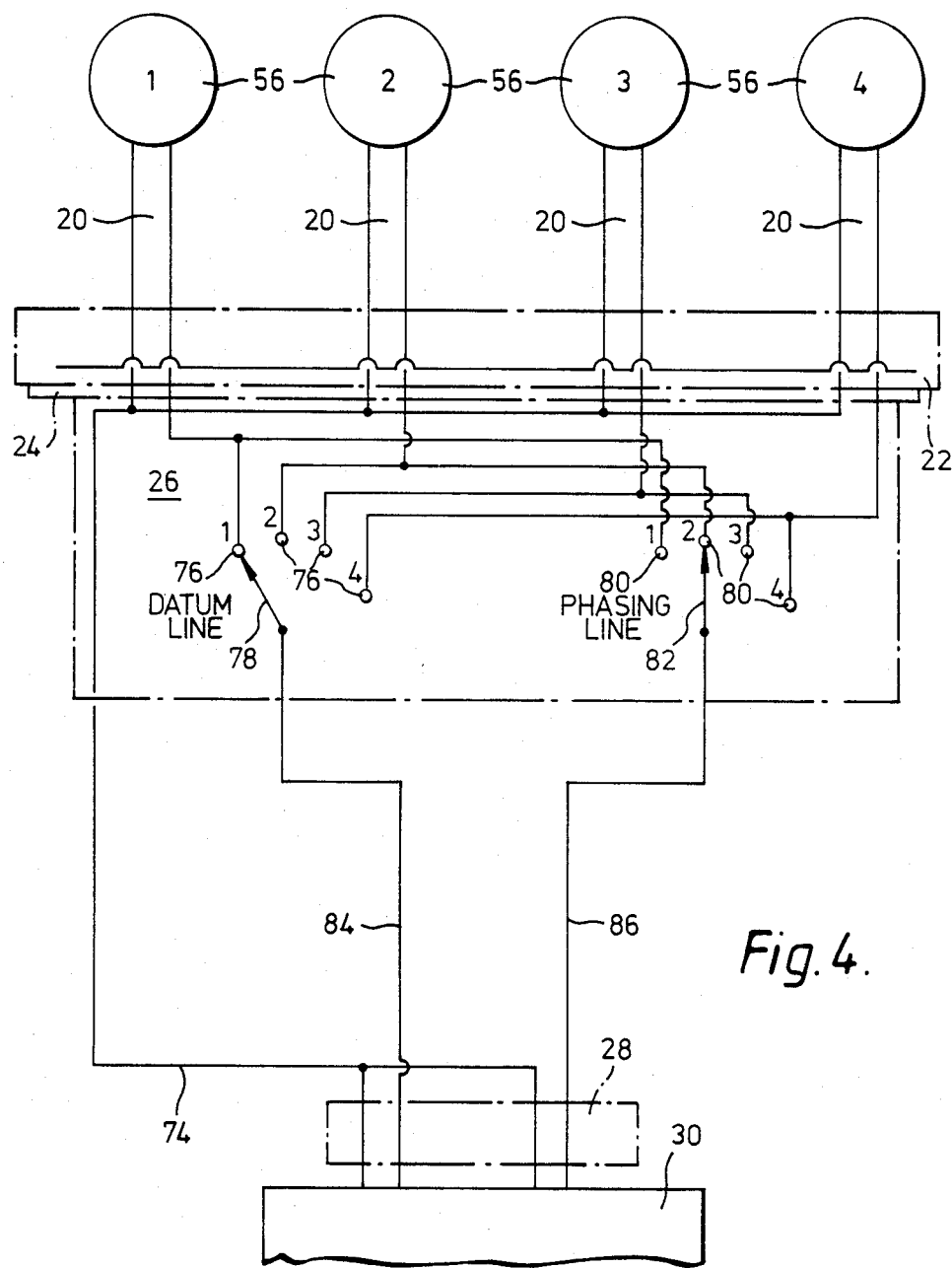
FIG. 4 is a diagram of part of the electrical circuitry of the system shown in FIG. 1.

The electrical circuitry of the system between the various pressure sensors 56 and the printed circuit board 30 is shown in FIG. 4. In this Figure, only four pressure sensors are shown for the sake of clarity and simplicity, but the actual manner in which the twelve pressure transducers of the system shown in FIG. 1 are connected to the printed circuit board 30 is precisely analogous, and will be readily apparent from FIG. 4 and the ensuing description.

The two conductors of each lead 76 (not shown in FIG. 4) are connected to two conductors of a corresponding one of the leads 20. Each of the conductors in the lead 20 are connected at a junction box 22 to respective conductors in the ribbon cable 24. This ribbon cable 24 is represented by very short lengths of line in FIG. 4. Every alternate conductor (not shown) of the ribbon cable 24 is grounded so that the conductors which are used to transmit electrical signals are screened from one another. At the selector box 26, one of the two ribbon cable conductors which are connected to each lead 20 is connected to a common conductor 74, and the other conductor connected to each lead 20 is connected to a corresponding terminal 76 of a datum line selector switch 78 and also to a corresponding terminal 80 of a phasing line selector switch 82. The other side of the datum line selector switch 78 is connected to a datum line conductor 84, and the other side of the phasing line selector switch 82 is connected to a phasing line conductor 86. The common conductor 74, datum line conductor 84 and phasing line conductor 86 are connected to the printed circuit board 30 via the connecting leads 28.

It will be appreciated from the foregoing description that the selector box 26 can be used to send the output signal of any selected pressure sensor 56 along the datum line conductor, and the output signal from any selected pressure sensor along the phasing line conductor 86. Thus, by observing the various connections, the particular cavity 46 which receives the injector 18 corresponding to the datum line of the injector pump 12 under test, which is usually the line from the first of the individual pump elements 14 in the pump 12, may be ascertained. The datum line selector switch 78 is then rotated to the corresponding setting, so that the signals from the pressure sensor associated with the datum line are connected to the datum line conductor 84. The phasing line selector switch 82 may then be rotated as desired to a position corresponding to the particular line of the pump 12 the phase of which in relation to the datum line is to be measured.

Figure 5:
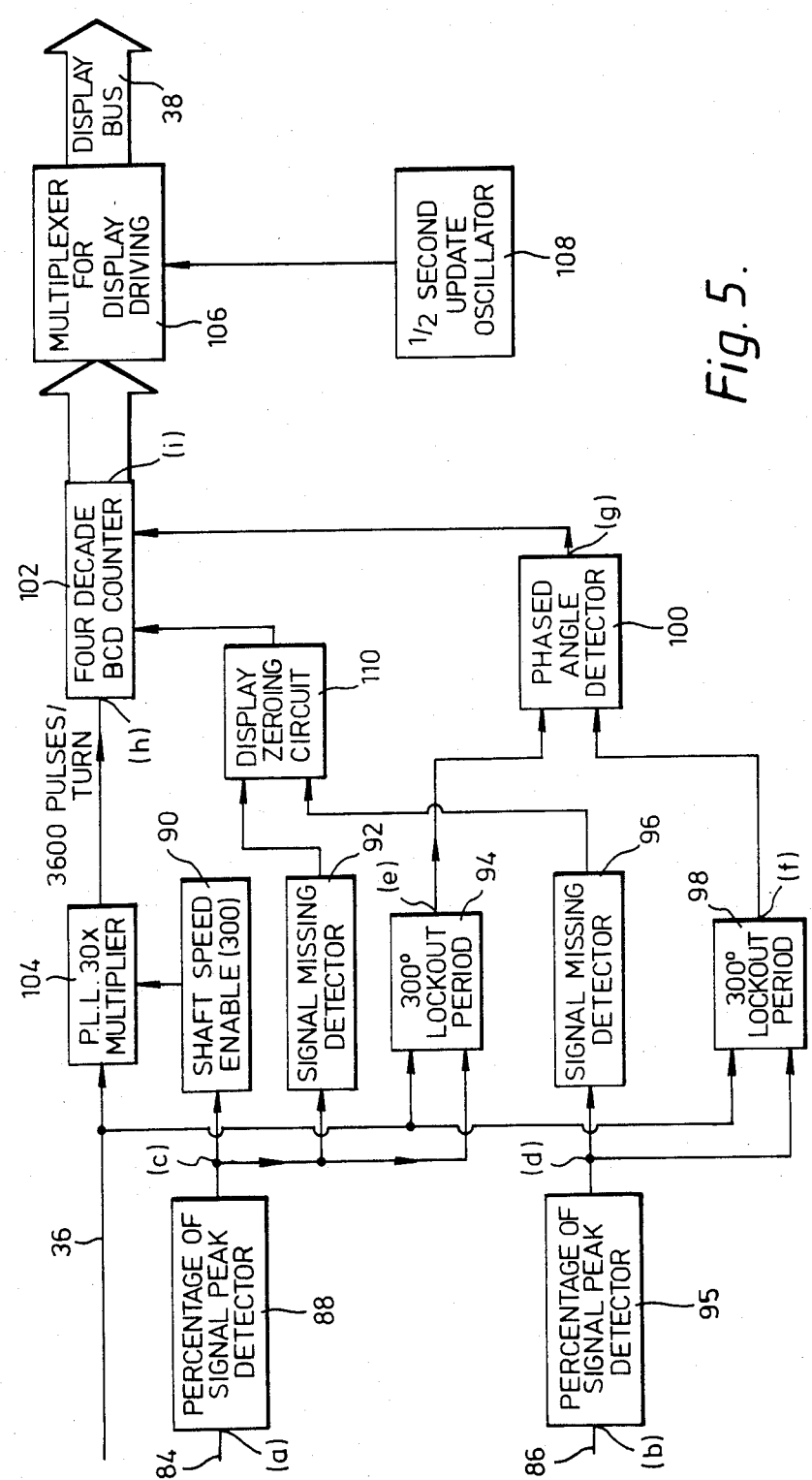
FIG. 5 is a block circuit diagram of electronic circuitry of the system shown in FIG. 1.

The electronic circuitry on the printed circuit board 30 is shown in FIG. 5. It comprises a percentage of signal peak detector 88 having its input connected to receive signals propagated along the datum line conductor 84. The percentage of signal peak detector 88 is constructed to memorise the average value of recent maximum peak voltage values received at its input, and to set a threshold value at a certain percentage of that peak value, for example 60%. It will produce a pulse signal each time this threshold value is exceeded, or each time the input voltage rises through that value. The stored value of maximum peak voltage is continuously up-dated by the detector 88. The output of the detector 88 is connected to a shaft speed enable circuit 90, a signal missing detector 92 in the form of a re-triggerable monostable multivibrator, and a lockout-period circuit 94.

A percentage of signal peak detector 95, having exactly the same structure as the detector 88, is connected to receive signals from the phasing line conductor 86. Its output is connected to a signal missing detector 96, having the same structure as the detector 92, and a further lockout-period circuit 98 having exactly the same structure as the circuit 94. A phase angle detector 100, comprising a bistable multivibrator, is connected to receive signals from the two lockout-period circuits 94 and 98, so that it is switched on by a leading edge of a signal from the circuit 94, and switched off by a leading edge of a signal from the circuit 98. The detector 100 produces an output signal for the duration of the time for which it is switched on. This output signal is received by an enabling input to a four decade BCD counter 102. This counter 102 also receives pulses emitted from a phase-locked-loop multiplier 104 connected to receive signals from the pick-up head 34 via the lead 36 and to give thirty times more output pulses than the number of input pulses it receives. In the present system there are therefore three thousand six hundred pulses emitted by the multiplier 104 for every turn of the drive shaft of the injector pump 12. The pulses from the counter 102 are passed to a multiplexer 106 for display driving, the multiplexer 106 being connected to the digital display 40 via the display bus lead 38. The multiplexer 106 is updated every half second by an oscillator 108.

The electronic circuitry shown in FIG. 5 also comprises a display zeroing circuit 110 connected to receive outputs from either one of the signal missing detectors 92 and 96 and to cause the counter 102 to output a zero value in the event that it receives a signal from either detector 92 or 96.

The operation of the circuitry shown in FIG. 5 will now be described in greater detail with reference to the graph shown in FIG. 6. At time $t_1$, the voltage level at the input to the detector 88, represented here by the reference (a) and also being the output from the pressure sensor 56 associated with the datum line, exceeds the threshold value for the time being set by the detector 88. The detector 88 therefore emits a pulse represented by the first squarewave in graph (c) in FIG. 6. Thus time $t_1$ represents the commencement of an injection from the injector 18 of the datum line. Although the signal in graph (a) is shown as having a relatively slowly rising edge, it would in fact be much sharper and more abrupt. It has been shown diagrammatically with a more slowly rising leading edge for the sake of clarity. It will be seen that further pulses are emitted by the detector 88, shown as two further squarewaves in graph (c), for the same injection by the injector 18, the signal passing through the threshold value twice more before it finally dies down a good while before the next commencement of injection is expected at time $t_3$. Exactly corresponding signals are generated at points (b) and (d), being the input and output respectively of the detector 95, and relating to injections through the injector 18 corresponding to the line whose phase angle is being measured. It will be seen that there is a delay between signals (b) and (a), and between signals (d) and (c), corresponding to the time between the commencements of injection occurring at times $t_1$ and $t_2$, and again at times $t_3$ and $t_4$, by the datum line and phasing line injectors respectively. The output from the lockout-period circuit 94 at point (e) is represented by graph (e) in FIG. 6. It has a leading edge at time $t_1$, and a trailing edge at $t_5$. The leading edge at $t_1$ corresponds to that of the first pulse from the detector 88. Starting at this time $t_1$, the lockout-period circuit 94 counts the number of pulses it receives from line 36 corresponding to a three hundred degree rotation of the drive shaft of the pump 12. At the end of this count, the lockout-period circuit 94 switches off, at time $t_5$, which is therefore the time of the trailing edge of its signal.

Figure 6:
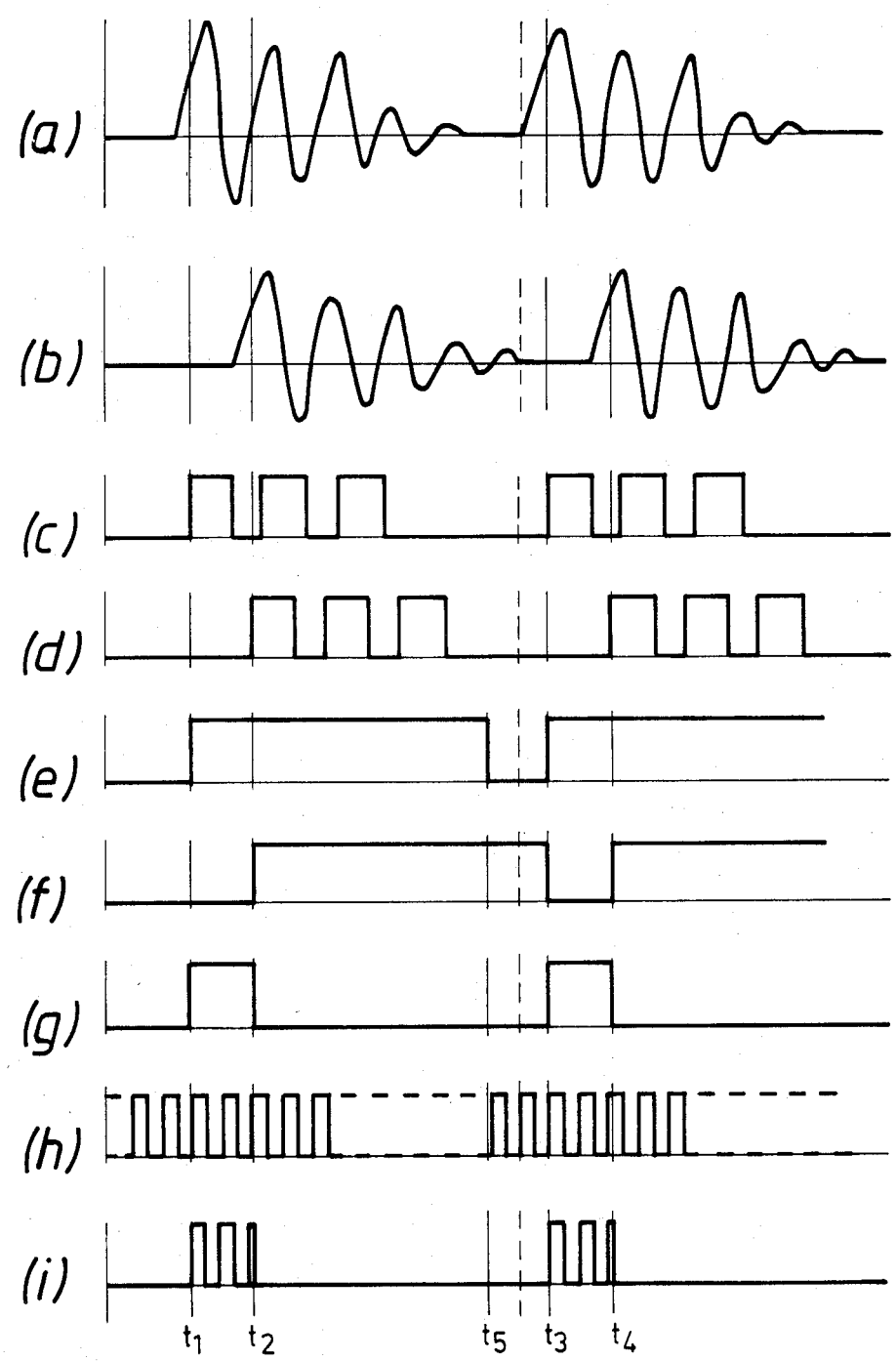
FIG. 6 shows a series of graphs which diagramatically represent electrical voltage values plotted against time at various points in the electronic circuitry shown in FIG. 5.

As a result of the output signal from the lockout-period circuit 94 extending over a period corresponding to a 300° rotation of the pump drive shaft, the two squarewaves in graph (c) of FIG. 6 immediately following the first squarewave have no effect on the output signal from the circuit 94.

The output from the lockout-period circuit 98, shown in graph (f) of FIG. 6, is exactly the same as that for graph (e) but delayed by the time $t_2 - t_1$, which represents the phase angle between the line under test and the datum line. The output from the phase angle detector 100, at point (g) in FIG. 5, and represented by graph (g) of FIG. 6, is therefore a squarewave lasting for the period $t_2 - t_1$. Graph (h) represents the input to the counter 102. It is only represented diagrammatically, as there would in fact be many more pulses. Fewer are actually shown, for the sake of clarity. Since the counter 102 is only enabled for the duration of the output signal (g), only those pulses appearing at the output to the counter 102 between the times $t_1$ and $t_2$, and then again between the times $t_3$ and $t_4$, are passed through to the multiplexer 106, as shown by graph (i) representing the output from the counter 102. Each count increment received by the multiplexer 106 represents 1/10th of a degree turn by the drive shaft of the pump 12 during the interval between the commencement of injection on the datum line and the immediately succeeding commencement of injection on the phasing lines. The numerical value indicated on the digital display 40 therefore shows a measurement of the phase angle between the phasing line and the datum line in 1/10ths of a degree.

The vertical broken line in FIG. 6 represents the passage of time equivalent to about a 360° rotation of the drive shaft. This arises as a result of parts of the circuitry (not shown) ensuring that commencement of injection signals are processed only for alternate revolutions of the pump drive shaft, to allow time for every part of the circuitry to operate for all possible phase angles.

A further advantage of the illustrated system is that it can check the mean auto-advance if the pump has this feature.

Because the illustrated system enables the commencement of injection to be measured precisely, and more particularly it can do this in a dynamic test with the actual injectors which are used with a given engine rather than some other test injectors, the system can be used to set the crank shaft of the engine with the correct angular position in relation to the pump drive shaft with greater ease and increased precision. Usually, the angular setting is such as to obtain commencement of injection relative to top dead centre.

Although the illustrated system has been described in detail in this specification, many variations, modifications and alterations will readily occur to a reader who is well versed in the art, while still keeping the changed system within the scope of the present invention. In particular, it will readily occur to such a reader how to make a system in accordance with the present invention with an increased maximum number of lines which can be tested simultaneously, or a reduced maximum number of lines.

We claim:

1. Apparatus for detecting instants of injection of fuel or test fluid through an injector of a fuel injection pump system for an internal combustion engine, comprising (a) a part defining at least one cavity which serves, when the apparatus is in use, to receive a nozzle end of such an injector, (b) a separate adaptor positioned at least at a mouth of said cavity to provide a fit between said part and such an injector when the apparatus is in use, and (c) a pressure sensor arranged, in relation to said cavity, to detect a change in pressure transmitted through the cavity interior following injection of fuel or test fluid through such an injector.

2. Apparatus according to claim 1, wherein said part defines a plurality of cavities 15, and wherein there are a plurality of such sensors, one for each cavity, and phase-angle checking means connected to the sensors to enable the apparatus to provide a check on the phase angles of the different lines of a multi-line fuel injection pump.

3. Apparatus according to claim 1, wherein each pressure sensor provides a signal in dependence upon changes in pressure rather than upon actual pressure.

4. Apparatus according to claim 3, wherein each pressure sensor comprises a piezogenerative crystal.

5. Apparatus according to claim 4, wherein said crystal is retained in a housing, an interior free space defined with said housing which accommodates said crystal being greater than said crystal so that the latter is retained loosely within the housing.

6. Apparatus according to claim 2, wherein the apparatus further comprises pump drive-shaft rotation monitoring means, wherein the phase-angle checking means comprises electronic circuitry connected to receive output signals from the pressure sensors and the monitoring means and to provide therefrom a check on the phase angles, and wherein selector switch means are connected between the pressure sensors and the electronic circuitry to selectively allow output signals from the pressure sensors to pass to the electronic circuitry.

7. Apparatus according to claim 6, wherein the electronic circuitry comprises a signal detector which is triggered when it receives an input signal that is beyond a threshold value, and lockout means connected to receive output signals from the detector and to provide a lockout signal for a predetermined interval after it first receives a signal from the detector.

8. Apparatus according to claim 7, wherein means are provided to set the predetermined interval to correspond to a given angle of rotation of the drive shaft rather than a given absolute time period.

9. A method of checking phase angles of different lines of a multi-line fuel injection pump for an internal combustion engine, comprising (a) inserting the nozzle end of the fuel injectors of the different lines into respective cavities using separate adaptors positioned at least at the mouths of said cavities to provide fits between said part and such injectors, (b) detecting instants at which changes in pressure occur in the cavities by means of respective pressure sensors arranged to detect pressure changes transmitted through the cavity interiors owing to fluid being shot through the nozzles of the injectors, and (c) using those detected instants to provide a check on the phase angles of the different lines.

10. For use in detecting the commencement of injection of fluid through an injector of a line of a fuel injection pump, a pressure sensor comprising a piezogenerative crystal retained in a housing, an interior free space defined within said housing which accommodates said crystal being larger than said crystal so that the latter is retained loosely within the housing.

11. Apparatus for detecting instants of injection of fuel or test fluid through an injector of a fuel injection pump system for an internal combustion engine, comprising (a) a part defining at least one cavity which serves, when the apparatus is in use, to receive a nozzle end of such an injector, (b) a separate adaptor positioned at least at a mouth of said cavity to provide a fit between said part and such an injector when the apparatus is in use, (c) a pressure sensor arranged, in relation to said cavity, to detect a change in pressure transmitted through the cavity interior following injection of fuel or test fluid through such an injector, (d) a piezogenerative crystal of said pressure sensor arranged to generate an electrical signal following such injection, (e) a housing of said pressure sensor, and (f) an interior free space with said housing which accommodates said crystal and which is larger than said crystal so that the latter is retained loosely within said housing.

* * * * *